Feb. 5, 1952 F. E. POSEY 2,584,498
RODENT TRAP AND EXTERMINATOR
Filed Feb. 3, 1950 2 SHEETS—SHEET 1

F. E. Posey
INVENTOR

BY C. A. Snow & co.
ATTORNEYS.

Feb. 5, 1952 F. E. POSEY 2,584,498
RODENT TRAP AND EXTERMINATOR
Filed Feb. 3, 1950 2 SHEETS—SHEET 2

F. E. Posey
INVENTOR

BY *C. A. Snow & Co.*
ATTORNEYS.

Patented Feb. 5, 1952

2,584,498

UNITED STATES PATENT OFFICE 2,584,498

RODENT TRAP AND EXTERMINATOR

Frank E. Posey, Lancaster, Calif.

Application February 3, 1950, Serial No. 142,159

1 Claim. (Cl. 43—69)

This invention relates to a combined rodent trap and exterminator, an important object of the invention being to provide a device of this character which may be used as a convenient and effective means for feeding poison bait to rodents, mice, ground squirrels or the like to exterminate them, without the danger of domestic animals having access to the poison bait.

Another important object of the invention is to provide a trap of this character which may be used in trapping the rodents, mice or ground squirrels, causing them to be dropped into a tank of water drowning the rodents, mice or ground squirrels when they attempt to remove the bait.

Still another object of the invention is to provide a combined trap and exterminator embodying a lower supporting section and an upper trapping section, means being provided for removably connecting the sections, whereby the sections may be readily disconnected to re-bait or remove the trapped rodents therefrom.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1:
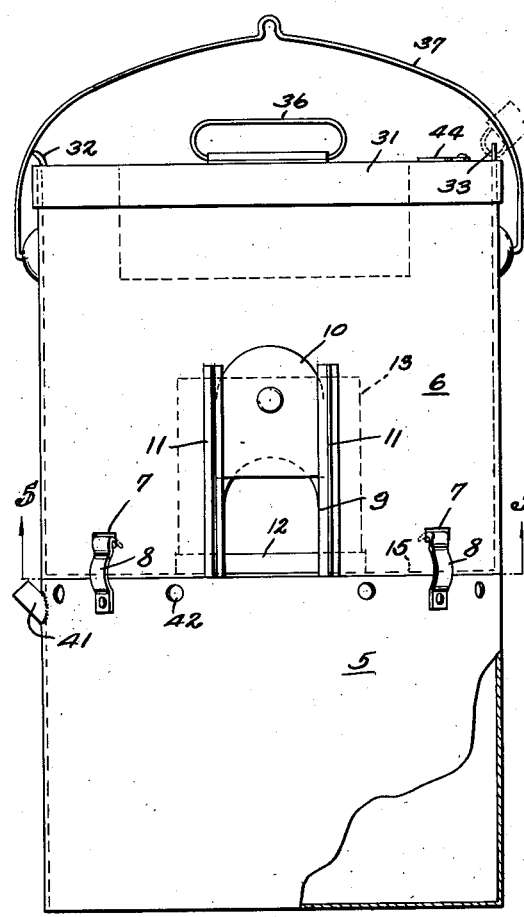
Figure 1 is an elevational view of a combined trap and rodent exterminator, constructed in accordance with the invention, the slide door of the upper section of the trap being shown in its open position.

Referring to the drawings in detail, the trap or exterminator includes the base or support 5 which is open at its upper end, on which the upper section or body portion 6 having openings 7, is positioned. The spring clips 8 carried by the base, extend through the openings 7, so that the body portion may be readily and easily removed or replaced on the base to facilitate removal of the trapped rodents.

The body portion 6 is provided with an entrance opening 9 formed in the wall thereof, the entrance opening being closed by means of the closure 10 which is slidably mounted in the guides 11.

Figure 2:
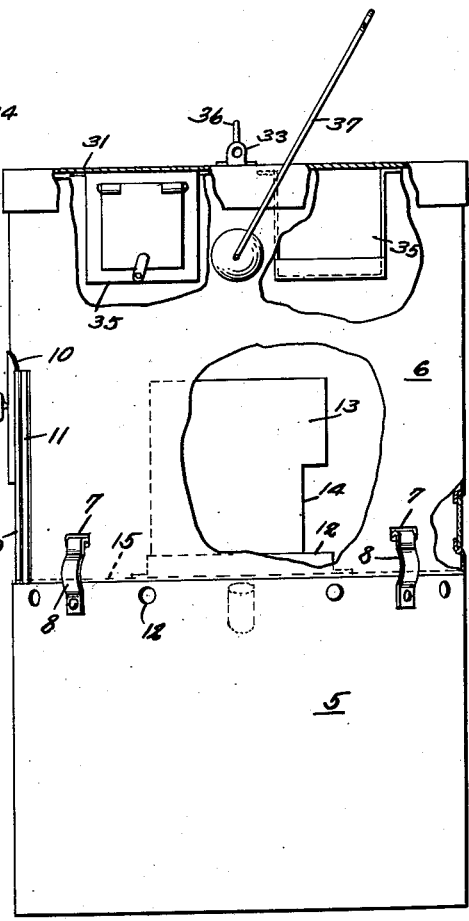
Fig. 2 is a side elevational view of the trap taken at right angles to Fig. 1, portions of the upper section of the trap having been broken away illustrating the bait receptacle and the bait storing compartments for containing bait for resetting the trap.
Figure 3:
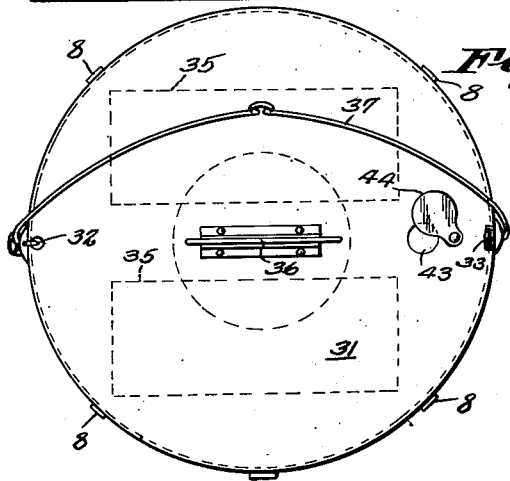
Fig. 3 is a plan view of the trap.

Disposed centrally of the body portion 6, is an upstanding annular flange 12 that provides a support for the bait holder 13 which is substantially cylindrical in formation, the bait holder having an opening 14 formed in the wall thereof, so that rodents will have access to the bait which is positioned therein. As shown by Fig. 2 of the drawings, the entrance opening 14 to the bait holder is disposed towards the rear of the body portion and directly opposite to the entrance opening 9, so that a rodent in entering the trap to obtain the bait contained in the bait holder 13, must pass around the side of the bait holder and gain access to the bait, through the opening 14.

The body portion 6 is provided with a stationary floor section 15 which extends substantially two thirds of the diameter of the body portion 6, and provides the bottom for the body portion.

The bottom of the body portion 6 also includes pivoted sections 16 which are mounted on the rods 17 that in turn are mounted in the bearings 18 secured to the stationary floor section, at the ends thereof.

Each of these pivoted sections 16, comprises an end section 19, and each of these sections 19 supports pivoted platform sections 20 and 21, the sections 20 and 21 being pivotally mounted on the rod 22 secured in the bearing bracket 23, the pivoted platform sections 20 and 21 having bearings 24 in which the rod 22 is positioned.

The end sections 19 are normally held in their closed positions, by means of the coiled springs 25 which are coiled around the rods 17, one end of the spring resting against the bottom of the stationary floor section 15, while the opposite end of the spring rests against the end section 19 associated therewith.

Coiled springs 26 are positioned around the rods 22, one end of each coiled spring bearing against the pivoted platform section 20 associated therewith, while the opposite end of the spring engages the pivoted section 21. Thus it will be seen that due to this construction, the sections 20 and 21 are normally held in their horizontal or closed positions by the action of the springs 26, the springs allowing downward swinging movement of the pivoted platform sections under the weight of a rodent standing thereon.

The reference character 27 indicates stops that extend forwardly from the end sections 19 and against which the sections 20 and 21 move to restrict upward movement of the sections 20 and 21 to hold the sections 20 and 21 normally flush with the stationary floor or bottom section 15.

Secured to each end section 19, is an upwardly extended arm 28 which is disposed adjacent to the outer edge of the section 19, the arms 28 extending appreciable distances beyond the pivot points of the sections 19, where they are formed with downwardly extended ends 29 to which the overbalancing weights 30 are secured, the weights acting to assist the springs 25 in returning the pivoted sections of the bottom of the body portion, to their normal horizontal positions.

The cover is indicated by the reference character 31 and fits over the open upper end of the body portion 6, the cover having an opening for the reception of the curved locking finger 32 that extends upwardly from the body portion 6, while at the opposite edge of the cover, an opening is provided to receive the apertured ear 33 which is designed to receive the padlock 34 to hold the cover in its closed position.

Supported by the cover are reserve bait compartments 35 in which bait may be positioned so that the trap may be readily rebaited when desired. The handle 36 provides means for removing or replacing the cover 31, while the bail 37 provides means whereby the complete trap may be readily and easily carried.

Figure 4:
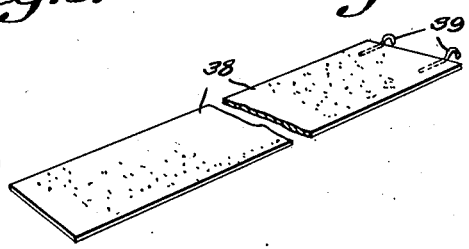
Fig. 4 is a perspective view of a ramp or runway over which the rodents pass on entering the trap.
Figure 5:
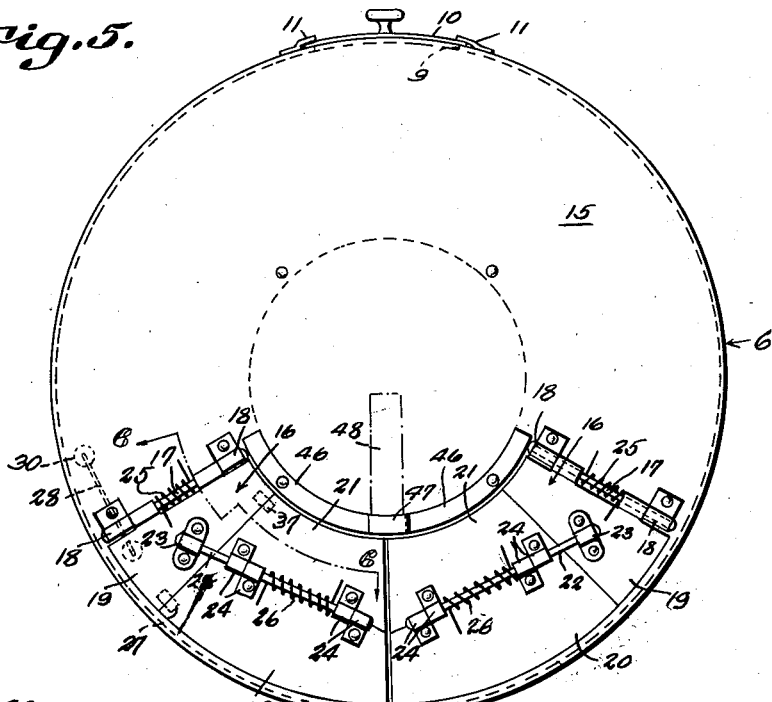
Fig. 5 is a sectional view taken on line 5—5 of Fig. 1.
Figure 6:
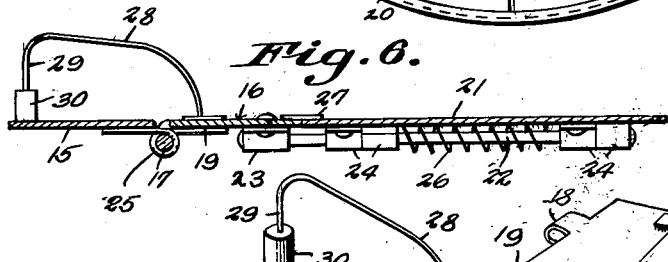
Fig. 6 is a sectional view taken on line 6—6 of Fig. 5.
Figure 7:
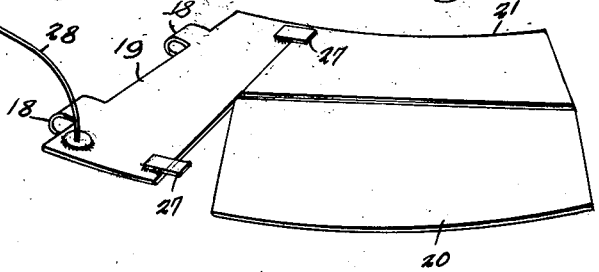
Fig. 7 is an enlarged perspective view illustrating one of the sections of the pivoted platform as swung downwardly releasing a rodent to the lower section of the trap.
Figure 8:
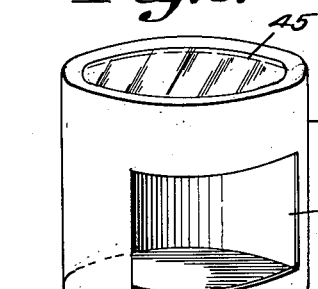
Fig. 8 is a view illustrating the bait receptacle and support for the bait receptacle.

As shown by Fig. 4 of the drawings, a ramp or runway 38 is provided, which ramp or runway is formed with hooks 39 adapted to be hooked over the edge of the base or support 5, so that the rodents may have easy access to the entrance opening of the body portion.

Walkways 40 are arranged within the body portion 6 adjacent to the end sections 19 and these walkways or plates are covered with poisonous dust or material so that when a rodent steps thereon, the poison dust or material will be picked up on the feet, which poison dust or material will be transferred to the stomach of the rodent, when he licks his feet in order to move the poison dust or poison material therefrom.

Should the rodent attempt to jump over the walkways 40, the rodent will land on the pivoted sections of the bottom of the body portion 6, the weight of the rodent tripping the platform sections, allowing the rodent to fall into the base or support 5.

A pipe indicated by the reference character 41 provides a filling opening through which water may be directed into the base or support 5 which provides a tank, so that rodents which are dropped into the base or support 5, will be drowned. Overflow openings 42 are provided so that water displaced by the rodents will pass from the base or support through the openings.

It might be further stated that it is contemplated to provide sight openings, one being indicated by the reference character 43 and located in the cover, the opening being normally closed by the pivoted closure 44.

The top of the bait holder 13 is also closed by means of the transparent cover 45, so that the bait may be viewed without the necessity of removing the bait holder from the body portion.

Should it be desired to use the trap for feeding poison to rodents and allow the rodents to pass from the trap to die at a remote place, the pivoted sections of the floor may be secured against movement. With this use in view, the strap 46 is provided and arranged adjacent to the inner edges of the pivoted platform sections 21, the strap 46 having an eye 47 through which the rod 48 moves, the rod 48 being designed to pass under the pivoted platform sections 20, supporting them in upright positions.

In the operation of the trap, the bait which is of a poisonous character, is placed in the bait holder and leveled off to the desired thickness. The rodents entering the trap through the entrance opening 9, will pass around the bait holder 13 in an attempt to reach the bait through the opening 14. As the rodent steps on the pivoted platform sections, the platform sections will swing downwardly, allowing the rodents to fall into the base or support where they may be trapped, and if the base or support is filled with water, it is obvious that the rodents will be drowned.

It will be obvious that with this structure an ever set trap is provided and the number of rodents caught by the device will only be governed by the size of the trap.

When desired, water may be placed in the base or tank 5, and while the water will cause the rodent trapped to drown, the scent of the fresh water emanating from the trap, particularly in dry weather, provides an effective lure for the rodents which are attracted to the trap.

Having thus described the invention, what is claimed is:

In a rodent exterminating trap, a base in the form of a tank, a body portion having an entrance opening, removably mounted on the base, a bait holder having an opening through which access to the bait is had, positioned within the body portion, a floor forming a part of the body portion, said floor having an opening formed therein, establishing communication between the base and body portion, pivoted platforms mounted on the floor, normally closing the opening in the floor, each pivoted platform comprising end sections pivotally connected with the floor, overbalancing weights connected with the end sections, normally urging the end sections to their closed positions, auxiliary platform sections supported by the end sections comprising pivotally connected sections movable as a unit or movable independently of each other, rods mounted on the end sections on which the auxiliary sections are pivotally mounted, said end sections and auxiliary sections normally closing the opening in the floor, and said auxiliary sections pivoting at right angles with respect to the end sections.

FRANK E. POSEY.

REFERENCES CITED

The following references are of record in the file of this patent:

UNITED STATES PATENTS

| Number | Name | Date |
|---|---|---|
| 141,346 | Hannah | July 29, 1873 |
| 271,952 | Turley | Feb. 6, 1883 |
| 745,364 | Martin | Dec. 1, 1903 |
| 960,170 | Harman | May 31, 1910 |
| 1,287,877 | Carlson | Dec. 17, 1918 |
| 1,507,639 | Waddell | Sept. 9, 1924 |

FOREIGN PATENTS

| Number | Country | Date |
|---|---|---|
| 303 | Great Britain | of 1900 |
| 3,400 | Great Britain | of 1901 |